Patented Nov. 29, 1927.

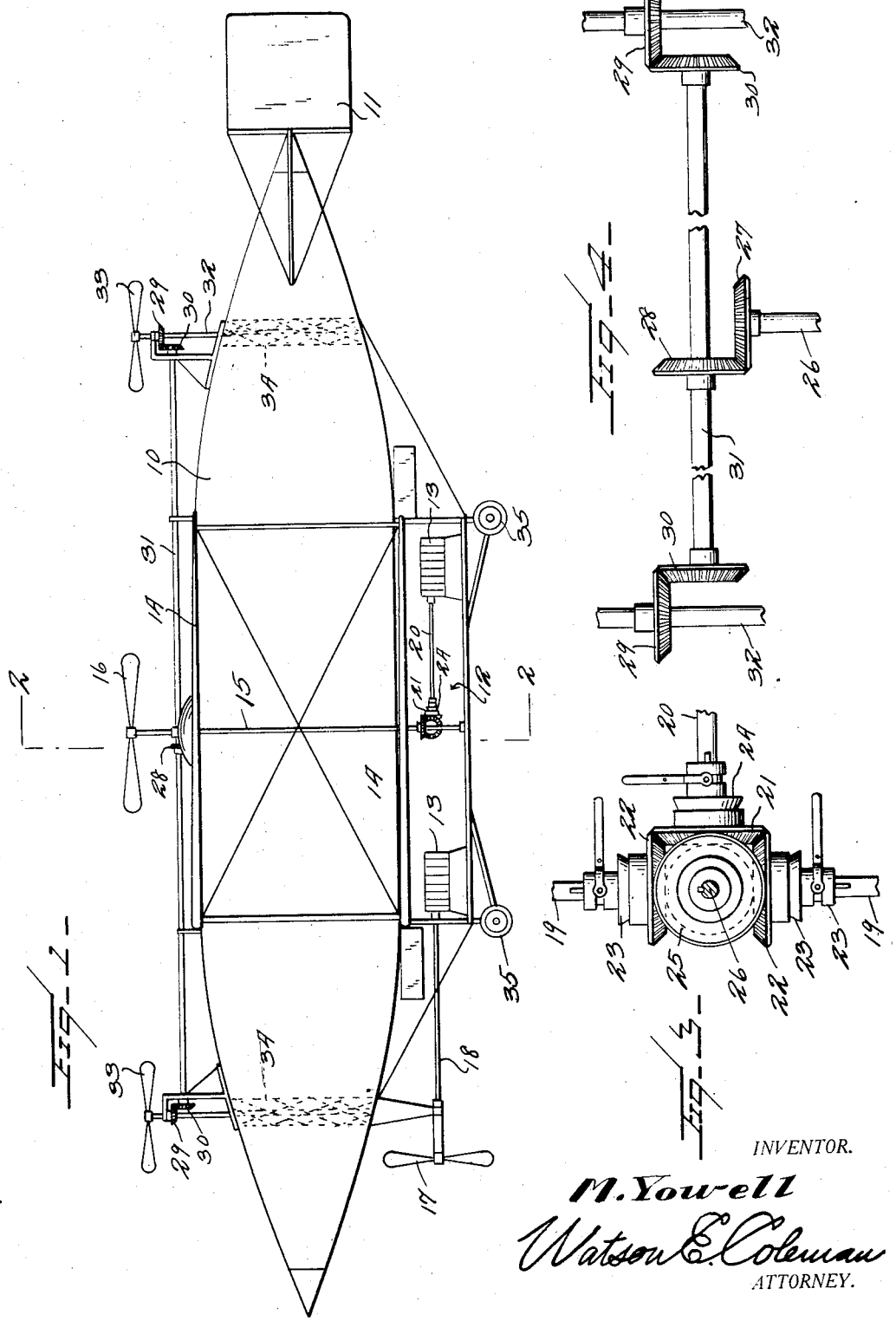

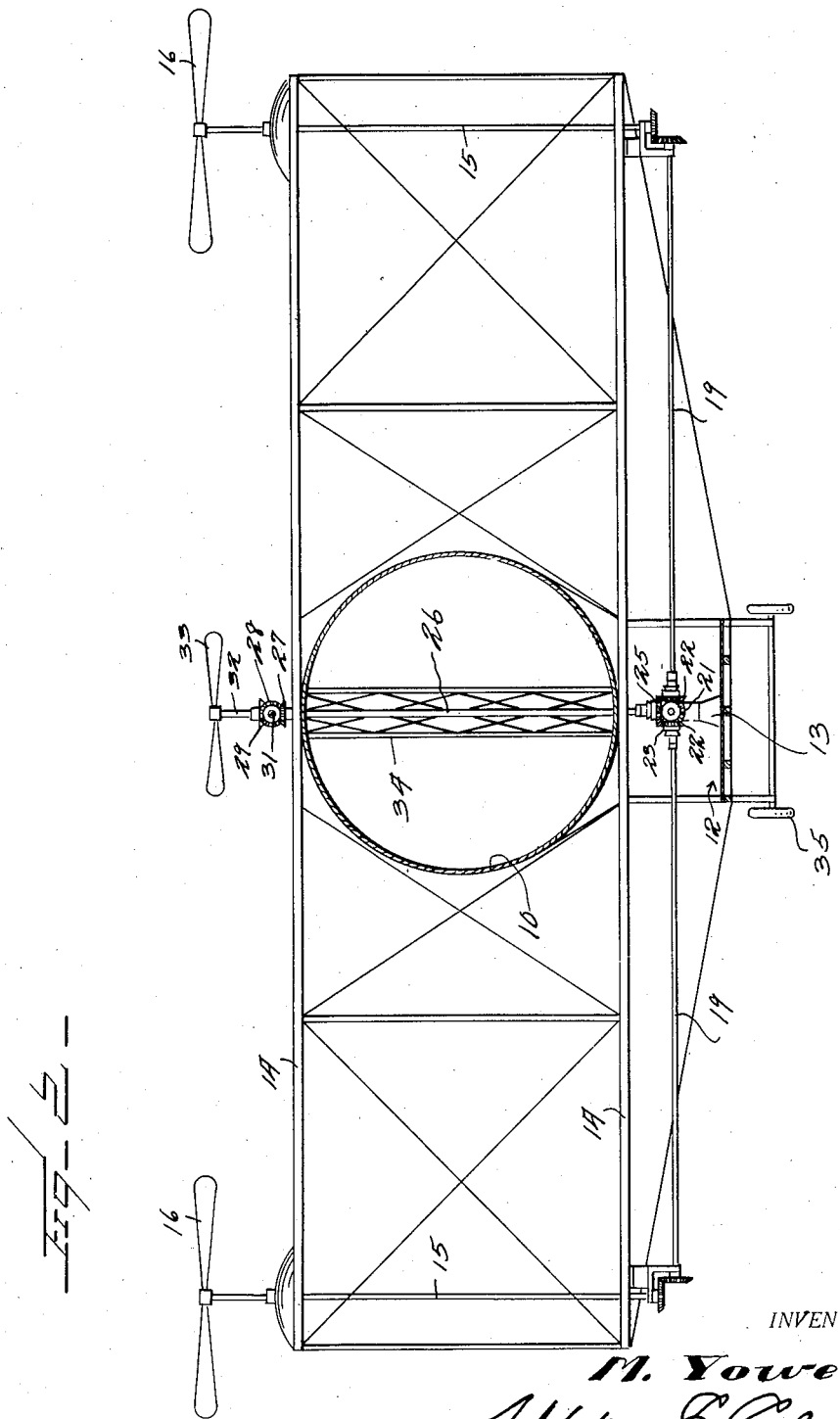

1,651,309

UNITED STATES PATENT OFFICE.

MARK YOWELL, OF CARLINVILLE, ILLINOIS.

AIRSHIP.

Application filed June 1, 1927. Serial No. 195,752.

This invention relates to airships of the lighter-than-air type, and the general object of the invention is to provide an airship of this character having a gas field or gas bag, laterally extending planes, and helicopters disposed at the ends of the planes and acting, when necessary, to vertically raise or lower the flying machine, thus permitting the machine to be safely landed without the necessity of using any special landing field.

A further object is to provide a construction of this kind wherein the helicopters will act as stabilizers.

Other objects will appear in the course of the following description.

My invention is illustrated in the accompanying drawings, wherein:—

Figure 1 is a side elevation of my improved airship;

Figure 2 is a section on the line 2—2 of Figure 1;

Figure 3 is a fragmentary top plan view of the driving gears, the vertical shaft being in section;

Figure 4 is an elevation of the driving gears for the upper helicopters;

Referring to these drawings, 10 designates a cylindrical, longitudinally tapered gas bag or field of any suitable construction, preferably provided with a rudder 11 at its rear end. Disposed below the gas bag 10 is the cabin 12 within which the engines 13 are located. Disposed above and below the gas bag and extending laterally out therefrom are the upper and lower planes or wings 14 of any suitable or usual construction, and mounted at the ends of the wings and extending downward through the wings are the vertical shafts 15. These shafts carry upon them the helicopters 16 of any suitable character. The forward end of the aircraft is provided with the traction propeller 17, shown as mounted upon a shaft 18 which extends into and is driven by an engine in the cabin 12.

Operated by the engine 13 are the transverse shafts 19 which are operatively engaged with the shafts 15 to operate the helicopters 16. This operative connection includes the engine shaft 20 carrying a beveled gear wheel 21 which engages the beveled gear wheels 22 mounted upon the shafts 19. Clutches 23 are provided whereby either of these shafts 19 may be disconnected, and a clutch 24 is provided on the shaft 23 whereby the gear wheel 21 may be operatively disconnected from the shaft 20. These clutches are operated by any suitable means. The gear wheels 22 and 21 engage a horizontal beveled gear wheel 25 carrying a shaft 26 which extends upward through the middle of the gas bag, as shown in Figure 2, and carries upon it a beveled gear wheel 27 engaging a beveled gear wheel 28. The gear wheel 28 drives a medially disposed shaft 31 having gear wheels 30 which mesh with gear wheels 29 mounted upon vertical shafts 32 carrying the helicopters 33 disposed at the ends of the gas bag, the supporting shafts passing downward through the enclosing casings 34.

The cabin is provided with suitable landing gear, indicated as wheels 35, and the structure, of course, supports the usual control mechanism and the tanks for containing the fuel for the engines.

It will be seen that my invention provides a machine which combines three flying machines which may rise into the air or alight on the flying field at the will of the operator. The gas field may be so designed as to carry any desired number of pounds as, for instance, a thousand pounds over and above the weight of the machinery and the landing ballast and the fuel would be supported by the helicopters. After a certain amount of fuel had been used, it is obvious that the helicopters would have power to handle the machine in landing. The planes will assist, of course, in supporting the machine in the air and will assist in stabilizing the same.

Obviously many changes might be made in the details of construction without departing from the spirit of the invention as defined in the appended claim.

I claim:—

An airship comprising an elongated gas bag, a sustaining plane disposed transversely thereof and located midway between the ends thereof, helicopter propellers mounted upon the gas bag and the plane at points above the median longitudinal dimensions thereof and located one in the vicinity of each of the ends thereof, a motor carried below the gas bag and means for operating the propellers from the motor.

In testimony whereof I hereunto affix my signature.

MARK YOWELL.